Sept. 25, 1928.  
H. G. PEDERSON  
COUNTERBALANCING DEVICE  
Filed Dec. 30, 1924   2 Sheets-Sheet 1

INVENTOR.  
Harold G. Pederson  
BY Parsons & Birdsell  
ATTORNEYS.

Sept. 25, 1928.                                              1,685,748
                    H. G. PEDERSON
                  COUNTERBALANCING DEVICE
              Filed Dec. 30, 1924       2 Sheets-Sheet 2

INVENTOR.
Harold G. Pederson
BY Parsons & Bodell
                    ATTORNEYS.

Patented Sept. 25, 1928.

1,685,748

UNITED STATES PATENT OFFICE.

HAROLD G. PEDERSON, OF SYRACUSE, NEW YORK.

COUNTERBALANCING DEVICE.

Application filed December 30, 1924. Serial No. 758,857.

This invention has for its object generally counter-balancing machines or load carrying machines in which the loads are carried by balanced spring tension and particularly a machine applicable for carrying portable tools as electric and air drills, grinders, hammers, nut tightening and driving machines, tapping machines and articles to be transferred from one location to another during the manufacture thereof as forgings, crank shafts, fly wheels, etc., which machine is particularly simple in construction and highly efficient and durable in use and can be readily adjusted within limits to the load it is to carry. Other objects appear throughout the specification.

The invention consists in the novel features and in the combinations and constructions hereinafter set forth and claimed.

In describing this invention, reference is had to the accompanying drawings in which like characters designate corresponding parts in all the views.

Figure 1:
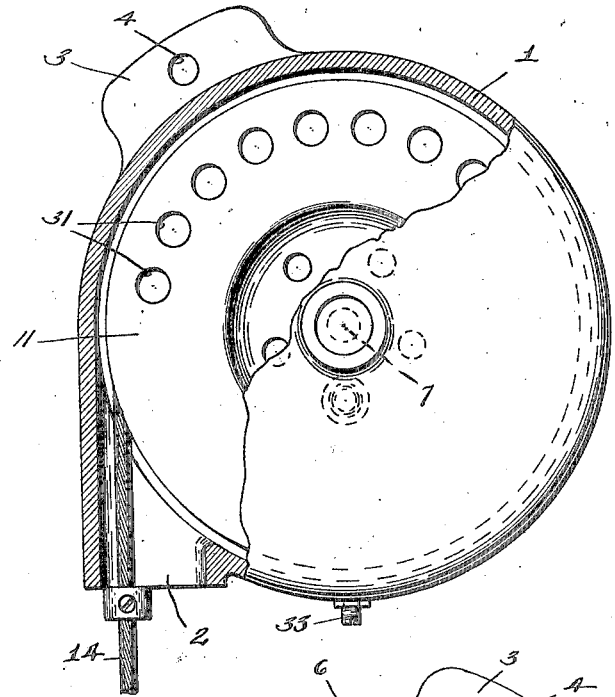
Figure 1 is a side elevation partly broken away of a counter-balancing machine embodying my invention.
Figure 2:
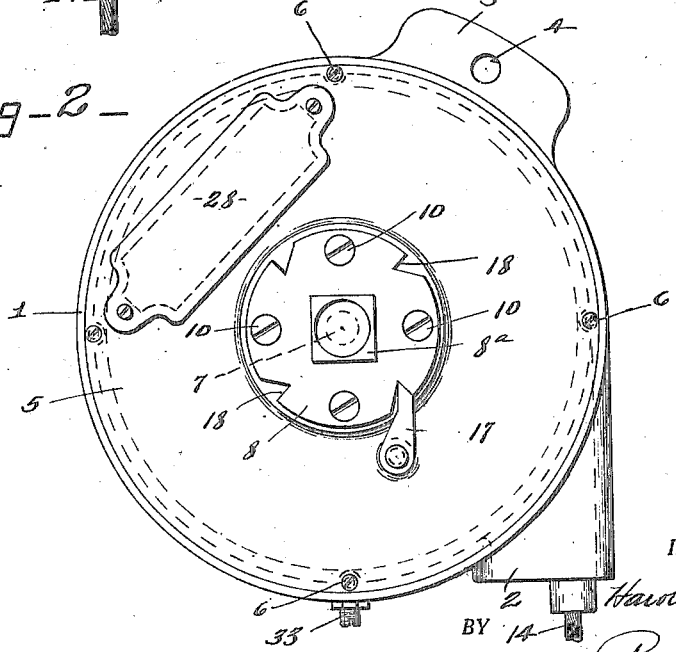
Figure 2 is an opposite side elevation from that seen in Figure 1.

This counter-balancing device comprises, generally, a frame or casing, a shaft mounted in the casing, a reel mounted within the casing on the shaft to rotate about the shaft, a coiled spring anchored at its inner end to the casing and at its outer end to the reel and means for varying the effective tension of the spring by changing the friction which is inherent in all coil springs, between the coils of the spring, and a load carrying cable winding on the reel.

The frame as here shown is in the form of a closed cylindrical casing 1 having an outlet 2 on its lower side extending in a tangential direction relatively to the reel and having means on its upper side by means of which the casing is flexibly suspended, this means being located nearly in a vertical line with the outlet 2 but preferably a little out of line with the cable between the line of pull of the cable and the axis of the reel. As here shown the casing is formed with a lug 3 on its upper side above the outlet 2, the lug being formed with a perforation 4 for receiving the link of a chain cable or other flexible suspending means. One side of the casing 1 comprises a removable cover 5 which is held in position in any suitable manner as by screws 6.

7 is a shaft mounted in the casing and 8 is a bearing member for the shaft, such bearing member being mounted in an opening in the cover plate 5 and having a hub 9 extending into the casing. This bearing member 8 is secured in position as by screws 10.

11 is a reel rotatably mounted on the shaft 7 and thrusting against the wall of the case 1, this reel having a cylindrical flange 12 concentric with the hub 9 and also having a groove 13 for receiving the load supporting cable 14.

15 is a coil spring anchored at its inner end at 16 to the case or some part thereof as the hub 9, and at its outer end to the reel 11 or the flange 12 thereof.

The tension of the spring is initially adjusted by removing the screws 10 from the bearing member 8 and turning the bearing member by suitable means as a wrench, the bearing member 8 being provided with a wrench head 13 for receiving the wrench. The bearing member 8 is held from turning in a retrograde direction while being adjusted and while the screws 10 are removed by a pawl 17 coacting with teeth 18 in the bearing member 8.

The inherent friction between the coils of the spring 15 is varied for adjusting the spring, within limits to the load being carried by varying the angle of the outer end portion 19 of the spring relatively to the coil part of the spring.

As here illustrated, the reel is provided with a series of abutments for the outer end of the spring, these being located at different distances from the center of the reel and each of these anchoring means being provided with guides as inclined faces sloping toward the next outer abutment for guiding the end 19 of the spring when released from one inner abutment into engagement with the next outer abutment.

20, 21, 22 and 23 designate the abutments, the abutment 20 extending farther toward the axis of the reel than the abutment 21, the abutment 21 projecting farther toward the center of the reel than the abutment 22 and the abutment 22 being located nearer the center of the reel than the abutment 23. The abutments 20, 21 and 22 are provided with inclined faces 24, 25 and 26 respectively on their inner faces. The face 24 inclines toward the abutment 21, the face 25 of the abutment 21 inclining toward the abutment 22 and the face 26 of the abutment 22 inclining toward the abutment 23. The abutment 23 is provided by forming a hole in the wall 12 of the reel. The end 19 of the spring is provided with a shoulder or hook 27 for engaging the abutments 20, 21, 22 and 23.

The cover plate 5 is provided with an opening which is closed by a detachable plate 28, this plate permitting access to the spring. The end 18 of the spring is detached from the particular abutment it is engaged with by inserting a tool, as a screw driver, through the hole covered by the plate 28 and prying the end 18 of the spring out of the engagement with the particular abutment with which it is engaged and the spring then being detached tends to unwind until the hook engages the next abutment.

When the spring is engaged with the abutment 20 nearest the center of the reel, the friction between the coils of the spring will be greatest and leverage of the spring on the reel least and when the spring is engaged with the abutment 23 farthest from the center of the reel, the friction between the coils of the spring will be least and the leverage greatest.

Assuming that the spring is engaged with the shoulder 20, upon prying of the spring off the abutment 20 the spring will turn relatively to the reel until it hooks on the abutment 21, and when released from the abutment 21 will engage the abutment 22 and when released from the abutment 22 will engage the abutment 23 and when released from the abutment 23 will again engage the abutment 20.

An opening 29 is left in the wall 12 of the reel for the purpose of facilitating the assembling of the spring therein and the edge 30 of this opening is so located relatively to the abutment 20 that the hook 27 of the spring clears the point 30 by reason of the fact that the outermost coil of the spring is pressing on the abutment 20 at the time the hook 27 is passing by the point 30 and holds the hook 27 out of engagement with the point 30.

Preferably, the reel is made heavier or overbalanced on one side than on the other and as here shown the side opposite that formed with the abutment 20, 21 and 22 is formed with a plurality of openings 31 for the purpose of lightening it. Thus the shoulders 20, 21 and 22 add an over-balancing weight to the reel.

A tool or other article to be counter-balanced is attached to the end of the cable 14. Assuming that a tool such as an automatic drill is supported by the cable 14, the operator after using the drill pushes it forwardly out of the way and in order to prevent a violent action of the spring in case the operator pushes the tool up suddenly, the overweight is provided in order that the spring will have to overcome the inertia of the overweight before applying any pull on the cable 14. The friction between the coils of the spring tends to overcome or lends itself to the adjustment of the spring to counter-balance the particular load and this friction can be quickly varied by anchoring the outer end of the spring with any one of the anchors or abutments 20, 21, 22 or 23.

Figure 3:
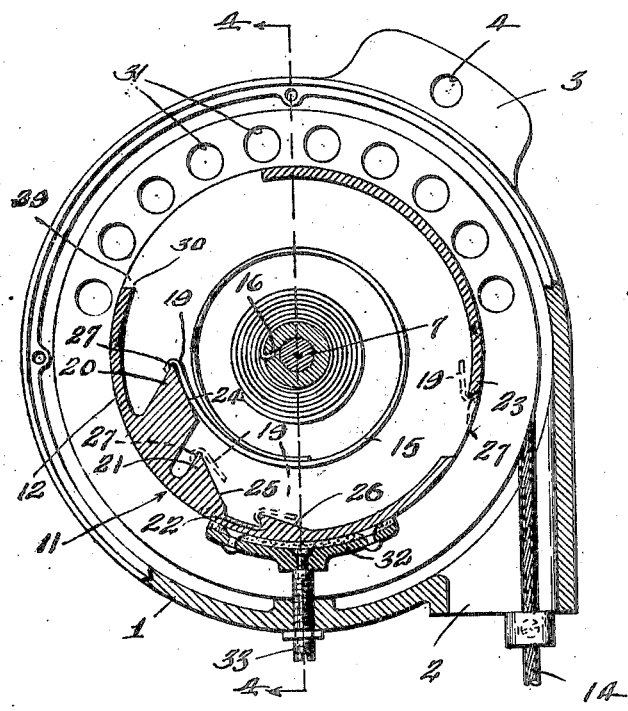
Figure 3 is a sectional view on line 3—3, Figure 4.
Figure 4:
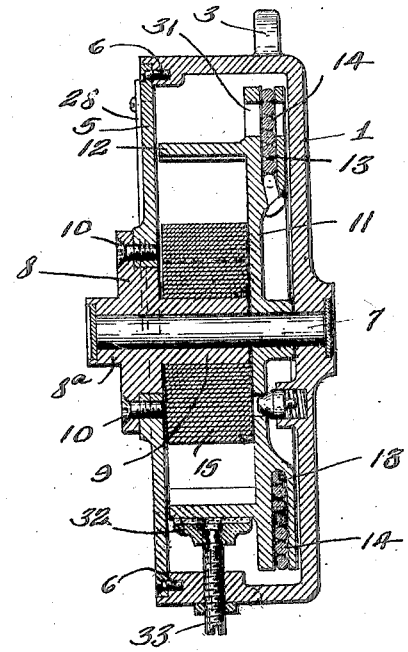
Figure 4 is a sectional view on line 4—4, Figure 3.

If desired, additional friction in the form of a brake may be used and as here shown the outer surface of the cylindrical flange may be utilized as a brake surface with which an adjustable brake shoe 32 coacts, this brake shoe 32 being shown in Figure 3 as carried by an adjustable threaded stem 33 threading through the peripheral wall of the case 1.

Figure 5:
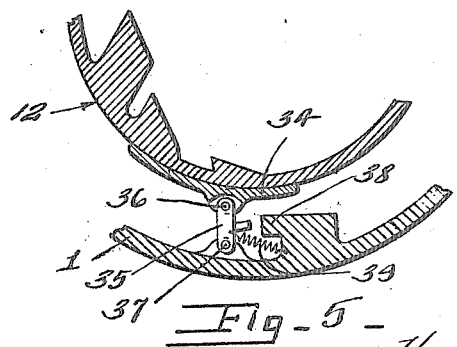
Figure 5 is a fragmentary detail view of a modified form of brake shoe.

In Figure 5, the brake shoe 34 is shown as arranged slightly out of a line radial with the reel and is supported by a link 35 pivoted at 36 to the shoe and at 37 to the case so that during movement of the reel by the spring, the shoe is carried toward a radial line and hence into greater frictional contact with the reel. The movement of the shoe 31 toward such radial line is limited by a stop 38 arranged in the path of the link 32. Displacement of the shoe 34 when the reel is being turned by the unwinding action of the cable 14 is prevented by a spring 39 which tends to move the shoe 34 toward the stop 38.

This counter-balancing machine is particularly advantageous in that the smaller machine can be adjusted to balance and suspend perfectly, articles weighing from 5 to 50 lbs., the next larger machine from 50 to 100 lbs. and in the next larger machine from 100 to 150 lbs. etc., the range of movement in any one machine being varied by changing the inherent friction between the coils of the spring by changing the anchoring point between the outer end of the spring and the reel. Initial adjustments for all loads within the range are made by tensioning the spring by turning the bearing member 8 or by adjusting the brake shoe 32.

This counter-balancing device can be mounted or suspended from a carriage movable along an overhead track and allows a large range of travel which cannot be provided for under old methods of counter-balancing for the reason that safety codes in all States require that all weights used for counter-balancing shall be enclosed in permanent and fixed locations. Longitudinal travel is prohibited with the use of weights.

This counter-balancer also eliminates rigid and fixed means of suspension, prevents accidents as it avoids overhead hazards, does away with anything that under the old methods are liable to fall or drop on the heads of the workmen.

This counter-balancer as it supports the tool while being used eliminates fatigue to the operator incidental to holding the tool or weight while suspended.

Under the old method, heretofore used, no complete balance could be obtained and in this counter-balancer owing to the inherent friction between the coils of the spring and the means for utilizing it to best advantage, practically all the weight of the tool or object incidental to supporting it, is carried by the counter-balancer and hence the operator relieved of the weight of the tool or other object.

This counter-balancer is further advantageous in that it can be readily adjusted to the different loads to be suspended that is, this counter-balancer is always in balance.

What I claim is:

1. In a counter-balancing device, the combination of a case, a shaft mounted therein, a reel mounted on the shaft, a coil spring having one end secured to the frame and its other end anchored to the reel and a load supporting cable winding on the reel, the reel having means located different distances from the axis of the reel for attaching the outer end of the spring thereto.

2. In a counter-balancing device, the combination of a case, a shaft mounted therein, a reel mounted on the shaft, a coil spring having one end secured to the frame and its other end anchored to the reel and a load supporting cable winding on the reel, the reel having means for shifting the outer end portion of the spring which is anchored to the reel, and thereby varying the angle of the outer end portion of the spring which is anchored to the reel, relatively to the coils of the spring.

3. In a counter-balancing device, the combination of a case, a shaft mounted therein, a reel mounted on the shaft, a coil spring having one end secured to the frame and its other end anchored to the reel and a load supporting cable winding on the reel, the reel being provided with a series of abutments arranged one in advance of the other, the abutments being located at different distances from the center of the reel and the outer end of the spring having means for engaging the abutments.

4. In a counter-balancing device, the combination of a case, a shaft mounted therein, a reel mounted on the shaft, a coil spring having one end secured to the frame and its other end anchored to the reel and a load supporting cable winding on the reel, the reel being provided with a series of abutments arranged one in advance of the other, the abutments being located at different distances from the center of the reel and the outer end of the spring having means for engaging the abutments, each abutment having means for guiding the spring when detached therefrom into engagement with the next outer abutment.

5. In a counter-balancing device, the combination of a case, a shaft mounted therein, a reel mounted on the shaft, a coil spring having one end secured to the frame and its other end anchored to the reel and a load supporting cable winding on the reel, the reel being provided with a series of abutments arranged one in advance of the other, the abutments being located at different distances from the center of the reel and the outer end of the spring having means for engaging the abutments, each abutment having an outwardly inclined face inclining toward the next outer abutment.

6. In a counterbalancing device, the combination of a casing, a shaft mounted therein, a reel mounted on the shaft and a coiled ribbon spring secured at one end to the casing and at its other end to the reel, a load supporting cable winding on the reel, the outer end portion of the spring being shiftable bodily relatively to the remainder of the spring and the casing to vary the friction between the coils of the spring.

7. In a counterbalancing device, the combination of a casing, a shaft mounted therein, a reel concentrically mounted on the shaft, a coil ribbon spring secured at one end to the casing concentric with the shaft and at its other end to the reel, a load supporting cable on the reel and means for shifting a portion of the spring radially of the coil relatively to the reel and the shaft and maintain the concentricity of the reel relatively to the shaft.

In testimony whereof, I have hereunto signed my name, at Syracuse, in the county of Onondaga, and State of New York, this 28th day of November, 1924.

HAROLD G. PEDERSON.